(12) United States Patent
Kothari et al.

(10) Patent No.: US 8,500,598 B2
(45) Date of Patent: *Aug. 6, 2013

(54) METHOD AND APPARATUS TO CONTROL MOTOR COOLING IN AN ELECTRO-MECHANICAL TRANSMISSION

(75) Inventors: Aniket Kothari, Southfield, MI (US); Jy-Jen F. Sah, West Bloomfield, MI (US); Ali K. Naqvi, White Lake, MI (US); William Joseph Gourlay, Saline, MI (US)

(73) Assignees: GM Global Technology Operations LLC, Detroit, MI (US); Daimler AG, Stuttgart (DE); Chrysler Group LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/433,491

(22) Filed: Mar. 29, 2012

(65) Prior Publication Data

US 2012/0191283 A1    Jul. 26, 2012

Related U.S. Application Data

(62) Division of application No. 12/252,353, filed on Oct. 15, 2008, now Pat. No. 8,167,773.

(60) Provisional application No. 60/982,865, filed on Oct. 26, 2007.

(51) Int. Cl.
*F16H 59/00* (2006.01)
*F16H 59/72* (2006.01)

(52) U.S. Cl.
CPC .................................. *F16H 59/72* (2013.01)
USPC .......................... 477/98; 701/54; 180/65.265

(58) Field of Classification Search
CPC ....................................................... F16H 59/72
USPC ............ 477/98; 180/65.265, 65.275, 65.285; 310/53; 184/104.1; 62/259.2; 701/54
See application file for complete search history.

(56) References Cited

U.S. PATENT DOCUMENTS

| | | | |
|---|---|---|---|
| 4,712,453 A | 12/1987 | Haley | |
| 4,962,678 A | 10/1990 | Murano | |
| 5,023,789 A | 6/1991 | Lampe | |
| 5,040,379 A | 8/1991 | Fukunaga et al. | |
| 5,548,539 A | 8/1996 | Vlach et al. | |
| 5,961,419 A | 10/1999 | Hisano et al. | |
| 6,631,651 B2 | 10/2003 | Petrzik | |

(Continued)

FOREIGN PATENT DOCUMENTS

DE    10 2005 003881 A1    7/2006
WO    2005/121521 A2      12/2005

*Primary Examiner* — J. Allen Shriver, II
*Assistant Examiner* — Jacob Meyer

(57) ABSTRACT

A powertrain includes an electro-mechanical transmission mechanically-operatively coupled to an internal combustion engine and first and second electric machines adapted to selectively transmit mechanical power to an output member. An apparatus for controlling the powertrain includes the first and second electric machines, a first electric machine cooling circuit directing a cooling hydraulic flow to the first electric machine, a second electric machine cooling circuit directing a cooling hydraulic flow to the second electric machine, a hydraulic control system receiving a hydraulic flow and selectively channeling the hydraulic flow to the first and second electric machine cooling circuits, and an active electric machine cooling control system monitoring temperatures of the first and second electric machines, monitoring operation of the hydraulic control system, and selectively controlling the hydraulic control system.

4 Claims, 4 Drawing Sheets

U.S. PATENT DOCUMENTS

| | | |
|---|---|---|
| 6,641,498 B2 | 11/2003 | Okuwaki |
| 6,715,597 B1 | 4/2004 | Buchanan et al. |
| 6,832,148 B1 | 12/2004 | Bennett |
| 6,868,318 B1 | 3/2005 | Cawthorne |
| 6,909,349 B1 | 6/2005 | Longardner et al. |
| 6,938,605 B2 | 9/2005 | Al-Khateeb |
| 7,154,236 B1 | 12/2006 | Heap |
| 7,322,900 B2 | 1/2008 | Ichioka et al. |
| 7,322,903 B2 | 1/2008 | Ortmann et al. |
| 7,556,120 B2 | 7/2009 | Sah et al. |
| 7,578,761 B2 | 8/2009 | Nishikawa et al. |
| 7,615,951 B2 | 11/2009 | Son et al. |
| 7,629,716 B2 | 12/2009 | Neal |
| 7,874,226 B2 | 1/2011 | Olson |
| 7,893,637 B2 | 2/2011 | Suhama et al. |
| 7,985,154 B2 | 7/2011 | Day et al. |
| 2002/0155922 A1 | 10/2002 | Okuwaki |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0050768 A1 | 3/2006 | Kriwan et al. |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0202989 A1 | 8/2007 | Ortmann et al. |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel et al. |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0066283 A1 | 3/2009 | Son et al. |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1 | 5/2009 | Heap |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |

| | | | | | |
|---|---|---|---|---|---|
| 2009/0118087 A1 | 5/2009 | Hsieh | 2009/0118931 A1 | 5/2009 | Kaminsky |
| 2009/0118089 A1 | 5/2009 | Heap | 2009/0118932 A1 | 5/2009 | Heap |
| 2009/0118090 A1 | 5/2009 | Heap | 2009/0118933 A1 | 5/2009 | Heap |
| 2009/0118091 A1 | 5/2009 | Lahti | 2009/0118934 A1 | 5/2009 | Heap |
| 2009/0118093 A1 | 5/2009 | Heap | 2009/0118935 A1 | 5/2009 | Heap |
| 2009/0118094 A1 | 5/2009 | Hsieh | 2009/0118936 A1 | 5/2009 | Heap |
| 2009/0118877 A1 | 5/2009 | Center | 2009/0118937 A1 | 5/2009 | Heap |
| 2009/0118879 A1 | 5/2009 | Heap | 2009/0118938 A1 | 5/2009 | Heap |
| 2009/0118880 A1 | 5/2009 | Heap | 2009/0118939 A1 | 5/2009 | Heap |
| 2009/0118882 A1 | 5/2009 | Heap | 2009/0118940 A1 | 5/2009 | Heap |
| 2009/0118883 A1 | 5/2009 | Heap | 2009/0118941 A1 | 5/2009 | Heap |
| 2009/0118884 A1 | 5/2009 | Heap | 2009/0118942 A1 | 5/2009 | Hsieh |
| 2009/0118885 A1 | 5/2009 | Heap | 2009/0118943 A1 | 5/2009 | Heap |
| 2009/0118886 A1 | 5/2009 | Tamai | 2009/0118944 A1 | 5/2009 | Heap |
| 2009/0118887 A1 | 5/2009 | Minarcin | 2009/0118945 A1 | 5/2009 | Heap |
| 2009/0118888 A1 | 5/2009 | Minarcin | 2009/0118946 A1 | 5/2009 | Heap |
| 2009/0118901 A1 | 5/2009 | Cawthorne | 2009/0118947 A1 | 5/2009 | Heap |
| 2009/0118914 A1 | 5/2009 | Schwenke | 2009/0118948 A1 | 5/2009 | Heap |
| 2009/0118915 A1 | 5/2009 | Heap | 2009/0118949 A1 | 5/2009 | Heap |
| 2009/0118916 A1 | 5/2009 | Kothari | 2009/0118950 A1 | 5/2009 | Heap |
| 2009/0118917 A1 | 5/2009 | Sah | 2009/0118951 A1 | 5/2009 | Heap |
| 2009/0118918 A1 | 5/2009 | Heap | 2009/0118952 A1 | 5/2009 | Heap |
| 2009/0118919 A1 | 5/2009 | Heap | 2009/0118954 A1 | 5/2009 | Wu |
| 2009/0118920 A1 | 5/2009 | Heap | 2009/0118957 A1 | 5/2009 | Heap |
| 2009/0118921 A1 | 5/2009 | Heap | 2009/0118962 A1 | 5/2009 | Heap |
| 2009/0118922 A1 | 5/2009 | Heap | 2009/0118963 A1 | 5/2009 | Heap |
| 2009/0118923 A1 | 5/2009 | Heap | 2009/0118964 A1 | 5/2009 | Snyder |
| 2009/0118924 A1 | 5/2009 | Hsieh | 2009/0118969 A1 | 5/2009 | Heap |
| 2009/0118925 A1 | 5/2009 | Hsieh | 2009/0118971 A1 | 5/2009 | Heap |
| 2009/0118926 A1 | 5/2009 | Heap | 2009/0118999 A1 | 5/2009 | Heap |
| 2009/0118927 A1 | 5/2009 | Heap | 2009/0144002 A1 | 6/2009 | Zettel |
| 2009/0118928 A1 | 5/2009 | Heap | 2009/0231075 A1 | 9/2009 | Moia |
| 2009/0118929 A1 | 5/2009 | Heap | 2009/0232183 A1 | 9/2009 | Salem et al. |
| 2009/0118930 A1 | 5/2009 | Heap | 2011/0106351 A1 | 5/2011 | Sah et al. |

METHOD AND APPARATUS TO CONTROL MOTOR COOLING IN AN ELECTRO-MECHANICAL TRANSMISSION

CROSS REFERENCE TO RELATED APPLICATIONS

This application is a divisional of U.S. application Ser. No. 12/252,353, filed on Oct. 15, 2008, which claims the benefit of U.S. Provisional Application No. 60/982,865 filed on Oct. 26, 2007, which are hereby incorporated by reference.

TECHNICAL FIELD

This disclosure pertains to control systems for electro-mechanical transmissions.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electro-mechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed. A hydraulic control system is known to provide pressurized hydraulic fluid for a number of functions throughout the powertrain.

Operation of the above devices within a hybrid powertrain vehicle require management of numerous torque bearing shafts or devices representing connections to the above mentioned engine, electrical machines, and driveline. Input torque from the engine and input torque from the electric machine or electric machines can be applied individually or cooperatively to provide output torque. Various control schemes and operational connections between the various aforementioned components of the hybrid drive system are known, and the control system must be able to engage to and disengage the various components from the transmission in order to perform the functions of the hybrid powertrain system. Engagement and disengagement are known to be accomplished within the transmission by employing selectively operable clutches.

Clutches are devices well known in the art for engaging and disengaging shafts including the management of rotational velocity and torque differences between the shafts. Clutches are known in a variety of designs and control methods. One known type of clutch is a mechanical clutch operating by separating or joining two connective surfaces, for instance, clutch plates, operating, when joined, to apply frictional torque to each other. One control method for operating such a mechanical clutch includes applying the hydraulic control system implementing fluidic pressures transmitted through hydraulic lines to exert or release clamping force between the two connective surfaces. Operated thusly, the clutch is not operated in a binary manner, but rather is capable of a range of engagement states, from fully disengaged, to synchronized but not engaged, to engaged but with only minimal clamping force, to engaged with some maximum clamping force. The clamping force available to be applied to the clutch determines how much reactive torque the clutch can carry before the clutch slips.

The hydraulic control system, as described above, utilizes lines filled with hydraulic fluid to selectively activate clutches within the transmission. However, the hydraulic control system can also perform a number of other functions in a hybrid powertrain. For example, an electric machine utilized within a hybrid powertrain generates heat. Hydraulic fluid from the hydraulic control system can be utilized in an electric machine cooling circuit to provide an electric machine cooling flow based upon or proportional to hydraulic line pressure ($P_{LINE}$). Additionally, hydraulic fluid from the hydraulic control system can be utilized to lubricate mechanical devices, such as bearings. Also, hydraulic circuits are known to include some level of internal leakage.

Hydraulic fluid is known to be pressurized within a hydraulic control system with a pump. The pump can be electrically powered or preferably mechanically driven. In addition to this first main hydraulic pump, hydraulic control systems are known to also include an auxiliary hydraulic pump. The internal impelling mechanism operates at some speed, drawing hydraulic fluid from a return line and pressurizing the hydraulic control system. The supply of hydraulic flow by the pump or pumps is affected by the speed of the pumps, the back pressure exerted by $P_{LINE}$, and the temperature of the hydraulic fluid ($T_{OIL}$).

The resulting or net $P_{LINE}$ within the hydraulic control system is impacted by a number of factors. FIG. 1 schematically illustrates a model of factors impacting hydraulic flow in an exemplary hydraulic control system, in accordance with the present disclosure. As one having ordinary skill in the art will appreciate, conservation of mass explains that, in steady state, flow entering a system must equal the flow exiting from that system. As applied to FIG. 1, a flow of hydraulic oil is supplied to the hydraulic control system by the pumps. The flow exits the hydraulic control system through the various functions served by the hydraulic control system. $P_{LINE}$ describes the resulting charge of hydraulic oil maintained in the system. Changes to flows out of the hydraulic control system affect $P_{LINE}$. For any flow through a system, the resulting pressure within the system depends upon the flow resistance within the system. Higher flow resistance, for instance indicating lower flow usage by the functions served by the hydraulic control system, results in higher $P_{LINE}$ for a given flow. Conversely, lower flow resistance, doe instance indicating higher flow usage by the functions served by the hydraulic control system, results in lower system pressures for a given flow. Applied to FIG. 1, $P_{LINE}$ changes depending upon usage of the hydraulic control system. For example, filling a previously unfilled transmission clutch consumes a significant amount of hydraulic oil from the hydraulic control system. The orifice leading to the clutch includes low resistance in order to draw the significant amount of hydraulic oil over a short time span. As a result, during the clutch filling process, $P_{LINE}$ in an otherwise unchanged hydraulic control system will reduce. Conversely, for a given set of functions served by the hydraulic control system, $P_{LINE}$ varies based upon the flow supplied by the pumps. An increase in flow supplied by a pump will increase $P_{LINE}$ in an otherwise unchanged hydraulic control system. For any given set of flow restrictions associated with the functions served, increased flow from the pumps will result in higher $P_{LINE}$.

The electric machine cooling function served by the hydraulic control system includes some flow of hydraulic oil to the electric machine or machines utilized by the hybrid powertrain. As is well known in the art, heat generated by an electric machine increases as the rotational speed of the electric machine. However, as described above, the rate of hydraulic oil and, therefore, the cooling capacity of the hydraulic oil flowing through an electric machine cooling loop increase only with $P_{LINE}$. As a result, situations can occur where high electric machine usage and low $P_{LINE}$ result in the electric machine not receiving sufficient cooling. Such a condition can be avoided by designing the flow restriction of the coolant loop to provide sufficient cooling for all foreseeable operating conditions of the electric machine, but such a design requires an excessive flow of hydraulic oil during periods when the cooling requirements of the electric machine do not warrant the high flow. A method to control electric machine cooling flow in a hydraulic control system based upon electric machine temperature would be beneficial.

SUMMARY

A powertrain includes an electro-mechanical transmission mechanically-operatively coupled to an internal combustion engine and first and second electric machines adapted to selectively transmit mechanical power to an output member. An apparatus for controlling the powertrain includes the first and second electric machines, a first electric machine cooling circuit directing a cooling hydraulic flow to the first electric machine, a second electric machine cooling circuit directing a cooling hydraulic flow to the second electric machine, a hydraulic control system receiving a hydraulic flow and selectively channeling the hydraulic flow to the first and second electric machine cooling circuits, and an active electric machine cooling control system monitoring temperatures of the first and second electric machines, monitoring operation of the hydraulic control system, and selectively controlling the hydraulic control system.

BRIEF DESCRIPTION OF THE DRAWINGS

One or more embodiments will now be described, by way of example, with reference to the accompanying drawings, in which:

FIG. 3 is a schematic diagram of an exemplary architecture for a control system and powertrain, in accordance with the present disclosure.

DETAILED DESCRIPTION

Figure 2:
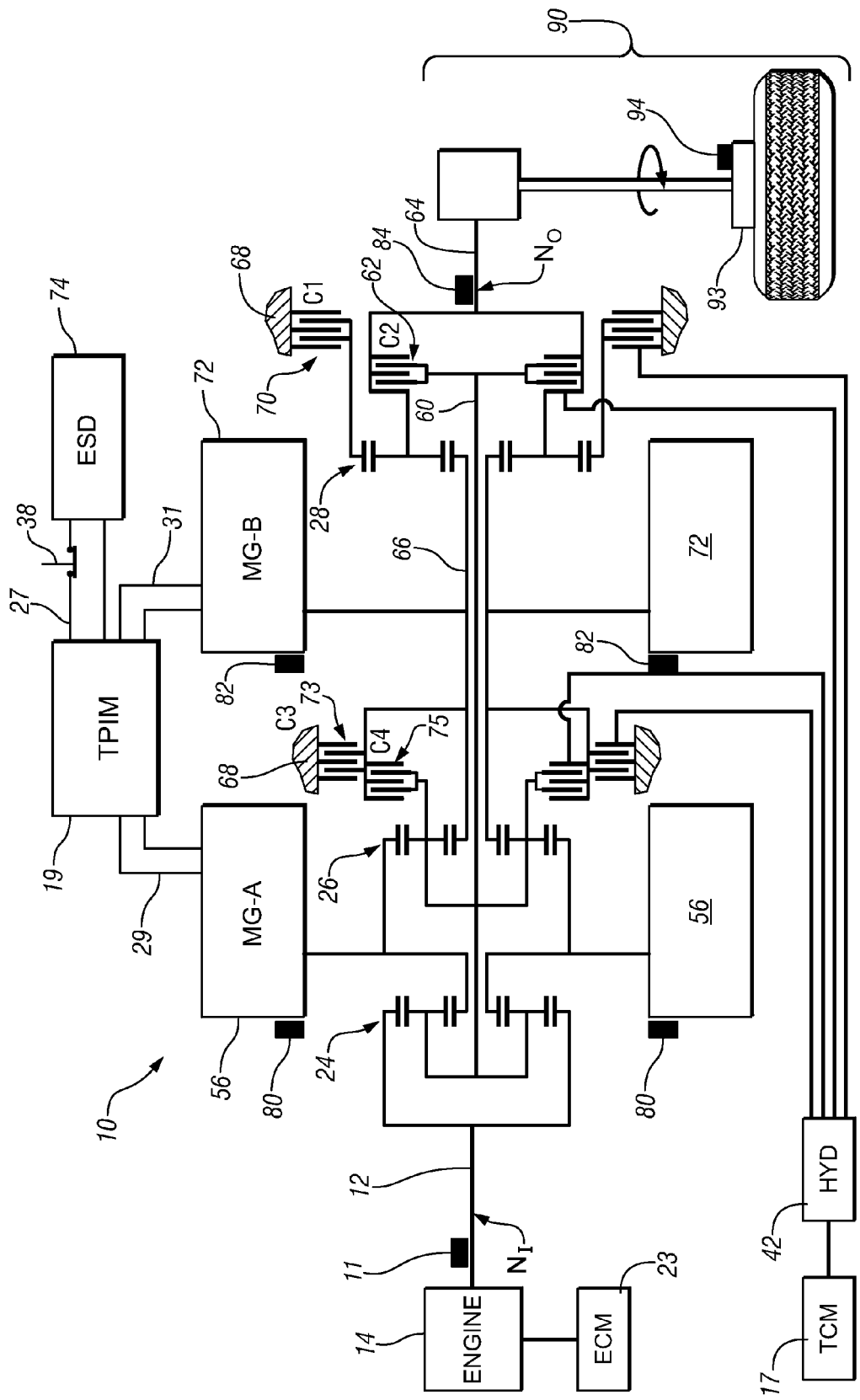
FIG. 2 is a schematic diagram of an exemplary powertrain, in accordance with the present disclosure.

Referring now to the drawings, wherein the showings are for the purpose of illustrating certain exemplary embodiments only and not for the purpose of limiting the same, FIGS. 2 and 3 depicts an exemplary electro-mechanical hybrid powertrain, in accordance with the present disclosure. The exemplary electro-mechanical hybrid powertrain in accordance with the present disclosure is depicted in FIG. 2, comprising a two-mode, compound-split, electro-mechanical hybrid transmission 10 operatively connected to an engine 14 and first and second electric machines ('MG-A') 56 and ('MG-B') 72. The engine 14 and first and second electric machines 56 and 72 each generate power which can be transmitted to the transmission 10. The power generated by the engine 14 and the first and second electric machines 56 and 72 and transmitted to the transmission 10 is described in terms of input torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transmit torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and output torque, can differ from the input speed, $N_I$, and the input torque, $T_I$, to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transmitting devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power, e.g., to vehicle wheels 93, one of which is shown in FIG. 2. The output power is characterized in terms of an output rotational speed, $N_O$ and an output torque, $T_O$. A transmission output speed sensor 84 monitors rotational speed and rotational direction of the output member 64. Each of the vehicle wheels 93, is preferably equipped with a sensor 94 adapted to monitor wheel speed, $V_{SS\text{-}WHL}$, the output of which is monitored by a control module of a distributed control module system described with respect to FIG. 3, to determine vehicle speed, and absolute and relative wheel speeds for braking control, traction control, and vehicle acceleration management.

The input torques from the engine 14 and the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31, in response to torque commands for the first and second electric machines 56 and 72 to achieve the input torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 3 is a schematic block diagram of the distributed control module system. The elements described hereinafter comprise a subset of an overall vehicle control architecture, and provide coordinated system control of the exemplary powertrain described in FIG. 2. The distributed control module system synthesizes pertinent information and inputs, and executes algorithms to control various actuators to achieve control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP') from which an operator torque request is determined, an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality such as antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the powertrain, serving to coordinate operation of the ECM 23, TCM 17, TPIM 19, and BPCM 21. Based upon various input signals from the user interface 13 and the powertrain, including the ESD 74, the HCP 5 generates various commands, including: the operator torque request ('$T_{O\_REQ}$'), a commanded output torque ('$T_{CMD}$') to the driveline 90, an engine input torque command, clutch torques for the torque-transfer clutches C1 70, C2 62, C3 73, C4 75 of the transmission 10; and the torque commands for the first and second electric machines 56 and 72, respectively. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

Each of the control modules ECM 23, TCM 17, TPIM 19 and BPCM 21 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the powertrain. Alternatively, algorithms may be executed in response to the occurrence of an event.

The exemplary powertrain selectively operates in one of several operating range states that can be described in terms of an engine state comprising one of an engine on state ('ON') and an engine off state ('OFF'), and a transmission state comprising a plurality of fixed gears and continuously variable operating modes, described with reference to Table 1, below.

TABLE 1

| Description | Engine State | Transmission Operating Range State | Applied Clutches | |
|---|---|---|---|---|
| MI_Eng_Off | OFF | EVT Mode I | C1 70 | |
| MI_Eng_On | ON | EVT Mode I | C1 70 | |
| FG1 | ON | Fixed Gear Ratio 1 | C1 70 | C4 75 |
| FG2 | ON | Fixed Gear Ratio 2 | C1 70 | C2 62 |
| MII_Eng_Off | OFF | EVT Mode II | C2 62 | |
| MII_Eng_On | ON | EVT Mode II | C2 62 | |
| FG3 | ON | Fixed Gear Ratio 3 | C2 62 | C4 75 |
| FG4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode I, or MI, is selected by applying clutch C1 70 only in order to "ground" the outer gear member of the third planetary gear set 28. The engine state can be one of ON ('MI_Eng_On') or OFF ('MI_Eng_Off'). A second continuously variable mode, i.e., EVT Mode II, or MII, is selected by applying clutch C2 62 only to connect the shaft 60 to the carrier of the third planetary gear set 28. The engine state can be one of ON ('MII_Eng_On') or OFF ('MII_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$, is achieved. A first fixed gear operation ('FG1') is selected by applying clutches C1 70 and C4 75. A second fixed gear operation ('FG2') is selected by applying clutches C1 70 and C2 62. A third fixed gear operation ('FG3') is selected by applying clutches C2 62 and C4 75. A fourth fixed gear operation ('FG4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine the commanded output torque, $T_{CMD}$, intended to meet the operator torque request, $T_{O\_REQ}$, to be executed at the output member 64 and transmitted to the driveline 90. Final vehicle acceleration is affected by other factors including, e.g., road load, road grade, and vehicle mass. The operating range state is determined for the transmission 10 based upon a variety of operating characteristics of the powertrain. This includes the operator torque request, communicated through the accelerator pedal 113 and brake pedal 112 to the user interface 13 as previously described. The operating range state may be predicated on a powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required to achieve the desired output torque to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transmit power therebetween to generate a power flow to the output member 64.

Figure 4:
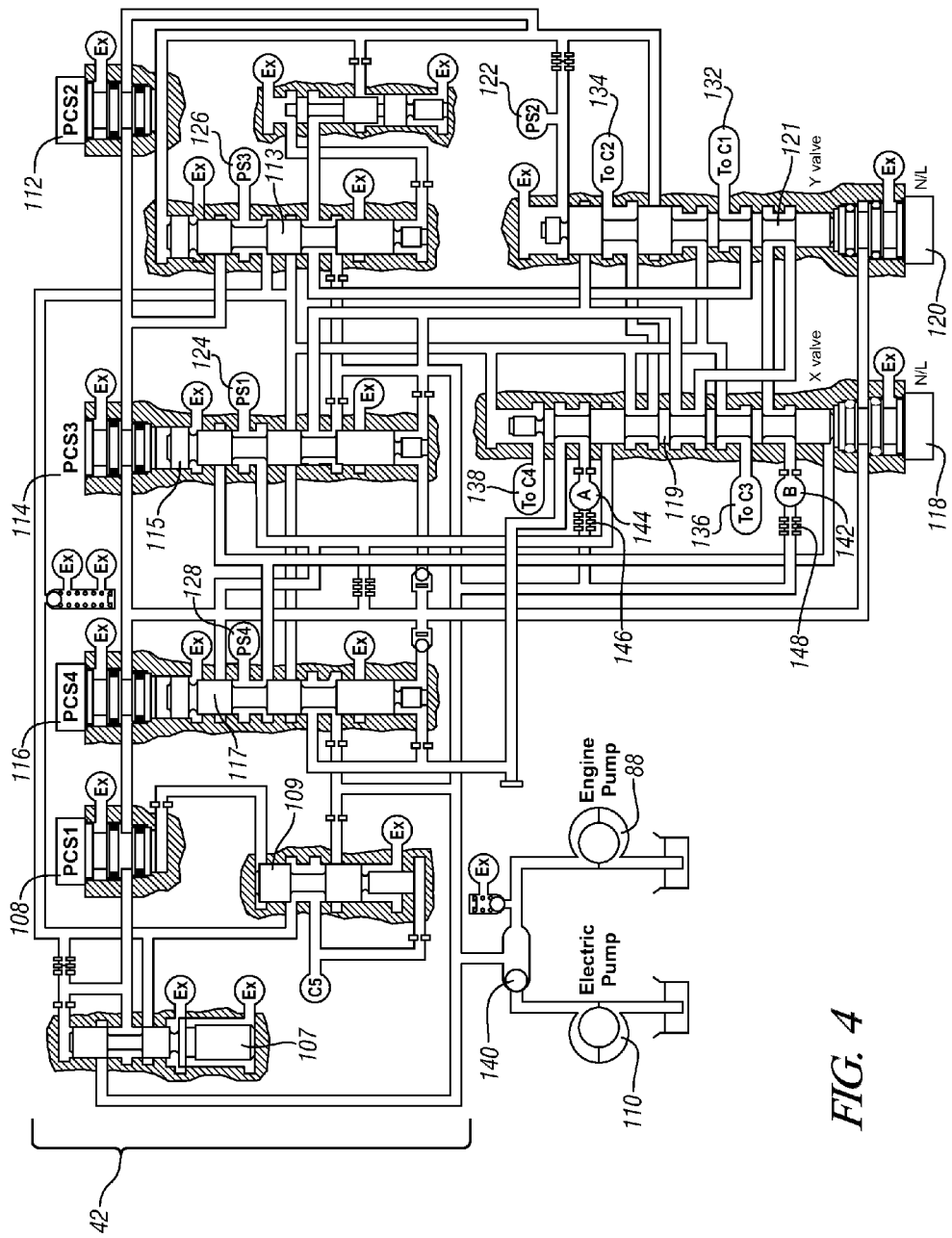
FIG. 4 is a schematic diagram of a hydraulic circuit, in accordance with the present disclosure.

FIG. 4 depicts a schematic diagram of the hydraulic control circuit 42 for controlling flow of hydraulic fluid in the exemplary transmission. A main hydraulic pump 88 is driven off the input shaft 12 from the engine 14, and an auxiliary pump 110 controlled by the TPIM 19 to provide pressurized fluid to the hydraulic control circuit 42 through valve 140. The auxiliary pump 110 preferably comprises an electrically-powered pump of an appropriate size and capacity to provide sufficient flow of pressurized hydraulic fluid into the hydraulic control circuit 42 when operational. The hydraulic control circuit 42 selectively distributes hydraulic pressure to a plurality of devices, including the torque-transfer clutches C1 70, C2 62, C3 73, and C4 75, active cooling circuits for the first and second electric machines 56 and 72 (not shown), and a base cooling circuit for cooling and lubricating the transmission 10 via passages 142, 144 (not depicted in detail). As previously stated, the TCM 17 actuates the various clutches to achieve one of the transmission operating range states through selective actuation of hydraulic circuit flow control devices comprising variable pressure control solenoids ('PCS') PCS1 108, PCS2 114, PCS3 112, PCS4 116 and solenoid-controlled flow management valves, X-valve 119 and Y-valve 121. The hydraulic control circuit 42 is fluidly connected to pressure switches PS1, PS2, PS3, and PS4 via passages 122, 124, 126, and 128, respectively. The pressure control solenoid PCS1 108 has a control position of normally high and is operative to modulate the magnitude of fluidic pressure in the hydraulic circuit through fluidic interaction with controllable pressure regulator 107 and spool valve 109. The controllable pressure regulator 107 and spool valve 109 interact with PCS1 108 to control hydraulic pressure in the hydraulic control circuit 42 over a range of pressures and may provide additional functionality for the hydraulic control circuit 42. Pressure control solenoid PCS3 112 has a control position of normally high, and is fluidly connected to spool valve 113 and operative to effect flow therethrough when actuated. Spool valve 113 is fluidly connected to pressure switch PS3 via passage 126. Pressure control solenoid PCS2 114 has a control position of normally high, and is fluidly connected to spool valve 115 and operative to effect flow therethrough when actuated. Spool valve 115 is fluidly connected to pressure switch PS2 via passage 124. Pressure control solenoid PCS4 116 has a control position of normally low, and is fluidly connected to spool valve 117 and operative to effect flow therethrough when actuated. Spool valve 117 is fluidly connected to pressure switch PS4 via passage 128.

The X-Valve 119 and Y-Valve 121 each comprise flow management valves controlled by solenoids 118, 120, respectively, in the exemplary system, and have control states of High ('1') and Low ('0'). The control states refer to positions of each valve to which control flow to different devices in the hydraulic control circuit 42 and the transmission 10. The X-valve 119 is operative to direct pressurized fluid to clutches C3 73 and C4 75 and cooling systems for stators of the first and second electric machines 56 and 72 via fluidic passages 136, 138, 144, 142 respectively, depending upon the source of the fluidic input, as is described hereinafter. The Y-valve 121 is operative to direct pressurized fluid to clutches C1 70 and C2 62 via fluidic passages 132 and 134 respectively, depending upon the source of the fluidic input, as is described hereinafter. The Y-valve 121 is fluidly connected to pressure switch PS1 via passage 122.

The hydraulic control circuit 42 includes a base cooling circuit for providing hydraulic fluid to cool the stators of the first and second electric machines 56 and 72. The base cooling circuit includes fluid conduits from the valve 140 flowing directly to a flow restrictor which leads to fluidic passage 144 leading to the base cooling circuit for the stator of the first electric machine 56, and to a flow restrictor which leads to fluidic passage 142 leading to the base cooling circuit for the stator of the second electric machine 72. Active cooling of stators for the first and second electric machines 56 and 72 is effected by selective actuation of pressure control solenoids PCS2 114, PCS3 112 and PCS4 116 and solenoid-controlled flow management valves X-valve 119 and Y-valve 121, which leads to flow of hydraulic fluid around the selected stator and permits heat to be transferred therebetween, primarily through conduction.

An exemplary logic table to accomplish control of the exemplary hydraulic control circuit 42 to control operation of the transmission 10 in one of the transmission operating range states is provided with reference to Table 2, below.

TABLE 2

| Transmission Operating Range State | X-Valve Logic | Y-Valve Logic | PCS1 | PCS2 | PCS3 | PCS4 |
|---|---|---|---|---|---|---|
| EVT Mode I | No Latch 0 | C2 Latch 0 | Normal High Line Modulation | Normal High MG-B Stator Cool | Normal High C1 | Normal Low MG-A Stator Cool |
| EVT Mode II | 0 | 1 | Line Modulation | C2 | MG-B Stator Cool | MG-A Stator Cool |
| Low Range | 1 | 0 | Line Modulation | C2 | C1 | C4 |
| High Range | 1 | 1 | Line Modulation | C2 | C3 | C4 |

A Low Range is defined as a transmission operating range state comprising one of the first continuously variable mode and the first and second fixed gear operations. A High Range is defined as a transmission operating range state comprising one of the second continuously variable mode and the third and fourth fixed gear operations. Selective control of the X-valve 119 and the Y-valve 121 and actuation of the solenoids PCS2 112, PCS3 114, PCS4 116 facilitate flow of hydraulic fluid to actuate clutches C1 70, C2 63, C3 73, and C4 75, and provide cooling for the stators the first and second electric machines 56 and 72.

In operation, a transmission operating range state, i.e. one of the fixed gear and continuously variable mode operations, is selected for the exemplary transmission 10 based upon a variety of operating characteristics of the powertrain. This includes the operator torque request, typically communicated through inputs to the UI 13 as previously described. Additionally, a demand for output torque is predicated on external conditions, including, e.g., road grade, road surface conditions, or wind load. The operating range state may be predicated on a powertrain torque demand caused by a control module command to operate of the electrical machines in an electrical energy generating mode or in a torque generating mode. The operating range state can be determined by an optimization algorithm or routine operable to determine an optimum system efficiency based upon the operator torque request, battery state of charge, and energy efficiencies of the engine 14 and the first and second electric machines 56 and 72. The control system manages the input torques from the engine 14 and the first and second electric machines 56 and 72 based upon an outcome of the executed optimization routine, and system optimization occurs to improve fuel economy and manage battery charging. Furthermore, the operation can be determined based upon a fault in a component or system.

Figure 1:
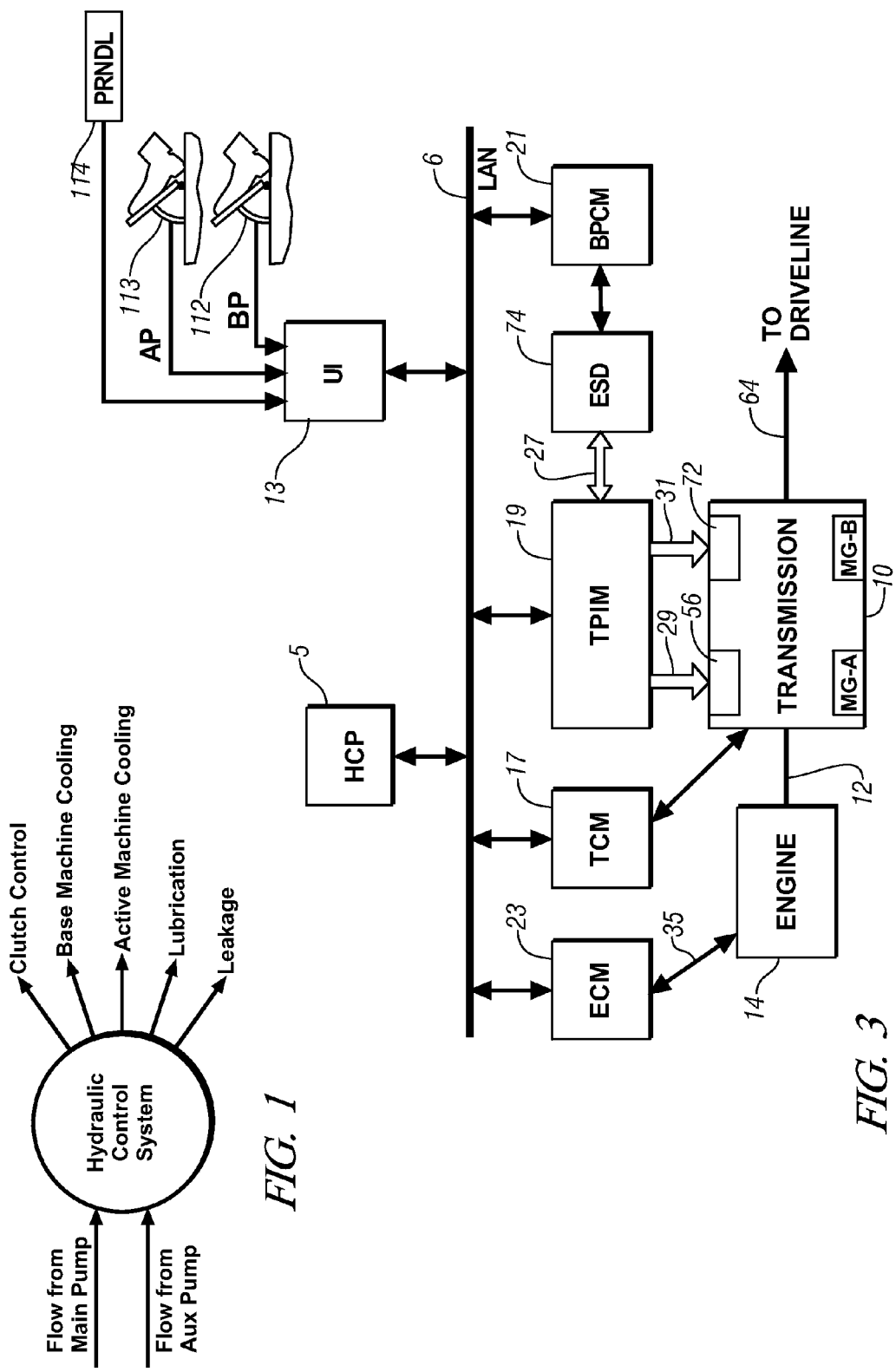
FIG. 1 schematically illustrates a model of factors impacting hydraulic flow in an exemplary hydraulic control system, in accordance with the present disclosure.

As described above, FIG. 1 illustrates flows entering and exiting a hydraulic control system. Hydraulic control system 200 with inflows and outflows is illustrated. The resulting pressure, $P_{LINE}$, determines the capacity of the functions served by the hydraulic control system. For example, clamping force available to a clutch is directly related to $P_{LINE}$ that can be applied. Electric machine cooling is one of functions served by the hydraulic control system. While it is necessary to be able to adequately cool the electric machine or machines, as described above, cooling constantly to the maximum cooling requirement of the electric machine constitutes an excessive drain upon the hydraulic control system, requiring either large pumping capacity from the main and auxiliary hydraulic pumps or draining $P_{LINE}$ capacity from the other functions served by the hydraulic control system. As a result, it is preferable to control the flow to the electric machine based upon the cooling requirements of the electric machine. A method is described to control electric machine cooling based upon electric machine cooling requirements based upon electric machine temperatures.

Electric machines are configured to receive a cooling hydraulic flow through a port, channel the hydraulic flow through a set of passages configured to transfer heat from the electric machine to the hydraulic fluid, and then channel the hydraulic fluid out of the heat exchanging area through an exhaust port to a hydraulic oil return line. The passages within the heat exchanging area are known to include features to maximize surface area for the hydraulic fluid to contact, through fins or other structures, so as to maximize the cooling effect that the hydraulic flow can have upon the electric machine.

As described above, electric machine cooling can include an electric machine cooling flow, providing a basic or base electric machine cooling flow based upon or proportional to $P_{LINE}$. However, such a coolant flow circuit, providing a base flow, can be insufficient to reduce temperatures in all operating circumstances. Hydraulic fluid from the hydraulic control system can be utilized in a selectable active electric machine cooling flow to provide additional electric machine cooling, when needed. An exemplary active electric machine cooling circuit is disclosed, wherein a selectable hydraulic flow circuit providing a hydraulic flow to an electric machine is activated and deactivated based upon electric machine temperatures.

As in FIG. 4 and Table 2, hydraulic flow in the exemplary hydraulic control system described above is accomplished through control of a plurality of flow management valves and a plurality of PCS devices. Referring to Table 2, active electric machine cooling is enabled when an exemplary X-valve is a zero position. When the X-valve is instead in a one position, fixed gear states are enabled, wherein two clutches can be operated at one time. This exclusive use of the hydraulic control system, allowing either active electric machine cooling or fixed gear state operation, is descriptive of choices that are required to operate the function served by the hydraulic control system based upon a limited flow of hydraulic fluid. One having ordinary skill in the art will appreciate that flows that can be supplied to the hydraulic control system at any given time are not unlimited, and functions served by the hydraulic control system must be prioritized when too many requests are made simultaneously of the system. Selecting between functions served by distinct valve settings enables prioritization based upon valve settings. Additionally, PCS devices can be used to selectively switch on and off active machine cooling circuits, if the exemplary X-valve is in the zero position. As described in Table 2 above, PCS devices can be utilized to controllably channel hydraulic fluid in different directions depending upon X-valve and Y-valve positions. In the context of an active electric machine cooling circuit, a PCS valve can be described as allowing flow through the active electric machine cooling circuit in a open position and blocking flow through the circuit in a closed position. In this way, active electric machine cooling circuits can be selectively activated based upon valve settings. It will be appreciated that the two level, X-valve and PCS device configuration is an exemplary embodiment of how selective activation of an active electric machine cooling circuit can be accomplished. However, a number of embodiments are envisioned, including individual valves or devices controlling each individual function served by the hydraulic control system, and this disclosure is not intended to be limited to the particular embodiments described herein.

Prioritization of different functions served by the hydraulic control system can be based upon impact to powertrain characteristics, such as drivability. An example of prioritization can be illustrated by a conflict between a fixed gear state and a request for electric machine cooling. If a fixed gear state is desired and in operation, shifting out of the fixed gear to enable an active motor cooling event will cause at least one clutch to transition and can impact commanded engine output. This effect upon operation of the powertrain, likely perceivable by an operator, is an adverse impact to drivability. In an alternative reaction, the fixed gear state can be maintained, and operation of the electric machine can be sustained to some higher temperature threshold, modulated to some reduced output, or deactivated based upon the electric machine temperature and known risks of the elevated temperature upon the electric machine. However, effects upon drivability of different actions taken to protect the electric machine from elevated temperatures need not affect drivability. In this way, a selection can be made to prioritize fixed gear operation over active electric machine cooling.

Prioritization of valve settings can improved by careful selection of valve configurations. Taking for example the exemplary transmission configuration described above, in fixed gear operation wherein operation includes two engaged clutches, no active motor cooling is possible. However, in such a configuration, one degree of freedom exists, such that a change in input speed as dictated by the input speed results in a fixed or determinable output speed. Torques provided by torque-generating devices sum to act upon the input. By contrast, in mode operation wherein a single clutch is engaged, two degrees of freedom exist, wherein output speed can vary for a given input speed based upon other variable such as electric machine output. In such a single clutch setting, electric machine output is actively used to modulate the resulting output speed. In such a setting, electric machine usage is likely to increase, creating a greater draw in current and resulting in higher cooling requirements in the electric machine. Wherein a single clutch is utilized in a dedicated EVT mode, the valving strategy discussed above allows for active cooling and can be utilized to satisfy the higher cooling requirements described.

High temperatures within electrical components or systems can cause damage or degraded performance. Damage from temperature can come in many forms known in the art and can cause the electrical components to cease functioning. Higher temperatures in an electrical conductor causes increased electrical resistance and can alter the performance of the conductor in the system. Temperature of the electric machines can be monitored using sensors known in the art.

Figure 5:
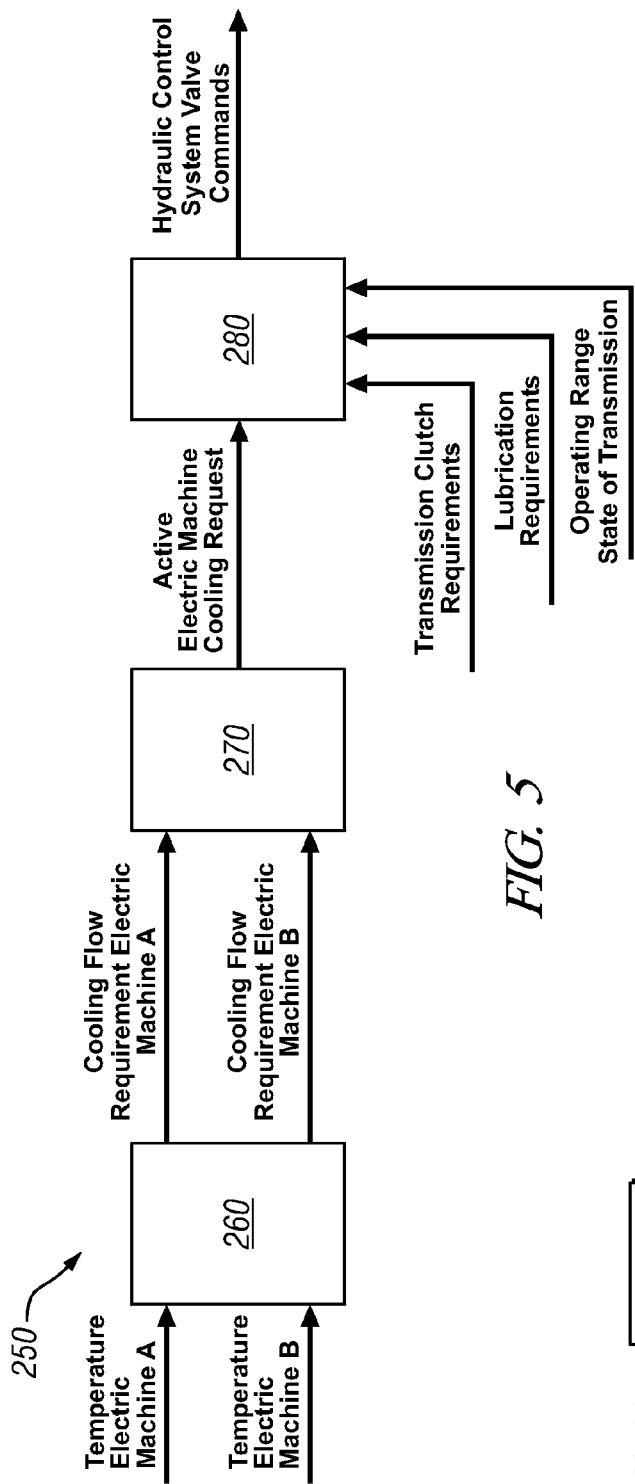
FIG. 5 schematically illustrates an exemplary information flow for controlling an active electric machine cooling circuit, in accordance with the present disclosure.

FIG. 5 schematically illustrates an exemplary information flow for controlling an active electric machine cooling circuit, in accordance with the present disclosure. Active electric machine cooling control system 250 comprises a first hydraulic powertrain cooling module 260, a second hydraulic powertrain cooling module 270, and a hydraulic control command module 280. Hydraulic powertrain cooling module 260 monitors inputs describing temperatures of an exemplary powertrain comprising two electric machines. However, it will be appreciated that system 250 can be utilized with powertrains including any number of electric machines or additional functions served by active cooling circuits. Hydraulic powertrain cooling module 260 applies programmed functions modeling heat rejection rates within the electric machine cooling circuits as a function of flow through the circuits or utilizes look-up tables to translate the temperatures of the monitored components into cooling flow requirements for each component, in this exemplary embodiment, cooling requirements for the two electric machines. Additionally, hydraulic powertrain cooling module 260 can input and factor base electric machine cooling flow to determine the cooling flow requirements. For example, if $P_{LINE}$ is towards a high range, more base electric machine cooling flow will result, reducing a need for active electric machine cooling flow. Flow requirements corresponding to electric machine temperatures may be developed experimentally, empirically, predictively, through modeling or other techniques adequate to accurately predict electric machine operation. Hydraulic powertrain cooling module 270 monitors the cooling flow requirements of electric machine A and electric machine B and compares the flow requirements to a threshold flow requirement or requirements. A threshold flow requirement can be a static number based upon average cooling capabilities of a base electric machine cooling circuit, or a requirement can be based upon variable inputs, such as $P_{LINE}$ or expected demands upon the electric machines. A single threshold can be utilized to activate an active electric machine cooling request, for example, if a cooling flow requirement for an a electric machine exceeds a threshold, then signal an active electric machine cooling request for that electric machine. Different thresholds can be used for different electric machines, based upon the specific operation or configuration of the powertrain. Alternatively, a single threshold can be used to say if a cooling flow requirement for either electric machine exceeds a threshold, then signal an active electric machine cooling request for both electric machines. Alternatively or additionally, multiple thresholds can be utilized, for example, additionally requesting modulation of electric machine operation if an electric machine cooling request is ignored or generating degrees of active electric machine cooling request based upon the threshold exceeded. Hydraulic control command module 280 receives an active electric machine cooling request as an input. The active electric machine cooling request is compared with other demands by functions served by the hydraulic control system, in this exemplary embodiment, including transmission clutch requirements and lubrication requirements. Additionally, hydraulic control command module 280 can monitor other factors affecting operation of the hydraulic control system. Exemplary factors include power loss of a hydraulic pump, describing pump output as an indicator of $P_{LINE}$; an operating state of the engine describing usage of the electric machines, operation of the main hydraulic pump, and expected transmission shifting; and overall powertrain operation. Based upon the comparison and the effects of any monitored inputs, if the active electric machine cooling request can be satisfied, then hydraulic control system valve commands are issued to activate the active electric machine cooling circuit. If the other demands of the functions served by the hydraulic control system outweigh the active electric machine cooling request, then the request is ignored. In this way, temperatures of electric machines can be used to control activation of an active electric machine cooling circuit.

Figure 6:
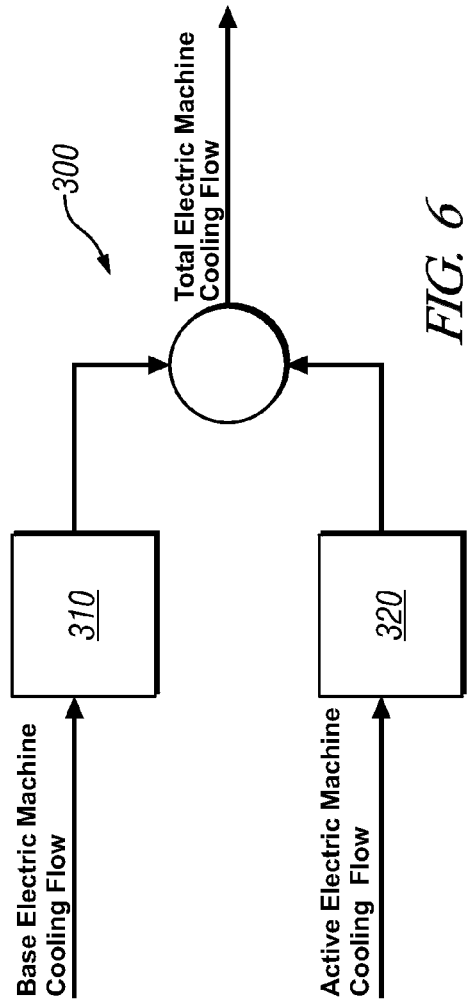
FIG. 6 schematically illustrates an electric machine cooling circuit, wherein a base electric machine cooling flow and an active electric machine cooling flow are added to form a total electric machine cooling flow, in accordance with the present disclosure.

Active electric machine cooling and base electric machine cooling can be additive or in the alternative. FIG. 6 schematically illustrates an electric machine cooling circuit, wherein a base electric machine cooling flow and an active electric machine cooling flow are added to form a total electric machine cooling flow, in accordance with the present disclosure. Electric machine cooling circuit 300 comprises a low flow restrictive orifice 310 and a high flow device 320. As described above, $P_{LINE}$ is a variable resulting from the flows entering and exiting the hydraulic control system. Low flow restrictive orifice 310 provides a path for base electric machine cooling flow to enter the cooling circuit. However, low flow restrictive orifice 310 utilizes a constricting orifice, such as a relatively small hole, to create a high flow restriction in the portion of the circuit providing base electric machine cooling flow. As described above, when temperatures in the electric machines are not high, it is beneficial to restrain the amount of unnecessary flow to the cooling circuit. High flow device 320 provides a path for active electric machine cooling flow to enter the cooling circuit. Cooling flow from an activated active electric machine cooling circuit is preferably greater than a flow from a base electric machine cooling circuit. For example, an active electric machine cooling circuit can create ten times the flow of a base electric machine cooling circuit in the same electric machine cooling circuit. High flow device 320 can include a high flow restrictive orifice, controlling the amount of flow resulting from the application of $P_{LINE}$. Alternatively, high flow device 320 can be omitted or be unitary with a PCS device controlling activation of the active electric machine cooling circuit, and the active electric machine cooling circuit can be designed to intrinsically include a particular flow restriction. Flows from the base electric machine cooling circuit and the active electric machine cooling circuit are combined to form the total electric machine cooling flow.

It will be appreciated that selective use of active cooling resulting in greater hydraulic flow to the electric machines can result in a lower required $P_{LINE}$ than simply utilizing base cooling. The use of a circuit permitting greater flow to the electric motors for a given $P_{LINE}$ can accomplish greater cooling than use of a circuit permitting lesser flow. In order to accomplish required cooling in a system utilizing only base cooling, the hydraulic pump would have to create a greater $P_{LINE}$ to compensate, thereby requiring a greater power draw to the pump. In this way, active cooling producing greater flow to the electric machines can result in lower power usage by the hydraulic control system.

Hydraulic flow through electric machine cooling circuits, as well as through other functions served by the hydraulic control system, depends upon $P_{LINE}$. Modulation of flow entering the hydraulic control system affects resulting $P_{LINE}$. $P_{LINE}$ can be either directly monitored through pressure sensors, such as pressure transducers well known in the art, or $P_{LINE}$ can be estimated based upon different variables or operation of various components. One exemplary method to estimate $P_{LINE}$ is a flow-based model based upon the analysis of FIG. 1, wherein flow entering the system is modeled based upon pump parameters, oil temperature, and estimated back pressure upon the pump; and wherein flow exiting the system is modeled based upon known operational characteristics of functions served by the hydraulic control system. By integrating the change in flow through the system or dV/dt through some interval, the resulting state of the hydraulic control system or $P_{LINE}$ can be estimated. Based upon a known or estimated value of $P_{LINE}$, operation of the hydraulic control system can be monitored, and in the event of a low or declining $P_{LINE}$ value, actions can be taken to boost $P_{LINE}$. In many configurations, operation of a main hydraulic pump, properly sized for the hydraulic control system, will produce adequate flow to maintain $P_{LINE}$. Some embodiments are configured such that an auxiliary electrically-powered hydraulic pump can be used to boost the main hydraulic, if needed. In embodiments where the main hydraulic pump is directly driven, and wherein an engine running/engine stopped strategy is employed in the powertrain, an auxiliary pump is used to supply hydraulic pressure. In the event that the $P_{LINE}$ drops below a threshold level, the auxiliary pump, running at some speed, can be commanded to run at some elevated speed up to a maximum speed in order to recover $P_{LINE}$. In the alternative, if $P_{LINE}$ drops and flows into the system cannot be boosted or elevated, functions served by the hydraulic control system can be selectively reduced. For example, if active electric machine cooling circuits to two electric machines are both activated, and $P_{LINE}$ drops below a threshold, one of the active electric machine cooling circuits can be de-activated momentarily to allow recovery, or the two active electric machine cooling circuits can be operated in a selectively alternating scheme to provide partial cooling to both circuits. In this way, if operation of the electric machine coolant circuits causes $P_{LINE}$ to drop, remedial actions can be taken to restore $P_{LINE}$.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Apparatus for controlling a powertrain comprising an electro-mechanical transmission mechanically-operatively coupled to an internal combustion engine and first and second electric machines adapted to selectively transmit mechanical power to an output member, said apparatus comprising:
    said first and second electric machines;
    a first electric machine cooling circuit directing a cooling hydraulic flow to said first electric machine comprising
        a first hydraulic circuit providing a first electric machine base cooling flow to said first electric machine, and
        a second hydraulic circuit selectively providing a first electric machine active cooling flow to said first electric machine;
    a second electric machine cooling circuit directing a cooling hydraulic flow to said second electric machine comprising
        a third hydraulic circuit providing a second electric machine base cooling flow to said second electric machine, and
        a fourth hydraulic circuit selectively providing a second electric machine active cooling flow to said second electric machine;
    a hydraulic control system receiving a hydraulic flow and selectively channeling said hydraulic flow to said first and second electric machine cooling circuits; and
    an active electric machine cooling control system monitoring temperatures of said first and second electric machines, monitoring operation of said hydraulic control system, and selectively controlling said hydraulic control system.

2. The apparatus of claim 1, wherein said active electric machine cooling control system comprises:
    a first hydraulic powertrain cooling module inputting said temperatures of said first and second electric machines and outputting cooling flow requirements of said first and second electric machines;
    a second hydraulic powertrain cooling module inputting said cooling flow requirements of said first and second electric machines and outputting an active electric machine cooling request; and
    a hydraulic control command module inputting said active electric machine cooling request, monitoring operation of said hydraulic control system, and selectively controlling said hydraulic control system.

3. The apparatus of claim 1, wherein said hydraulic control system comprises:
    a flow management valve selectively enabling said cooling hydraulic flows to said first and second electric machines.

4. The apparatus of claim 3, wherein said hydraulic control system further comprises:
    a pressure control solenoid selectively directing said hydraulic flow to said first electric machine cooling circuit; and
    a pressure control solenoid selectively directing said hydraulic flow to said second electric machine cooling circuit.

* * * * *